Sept. 18, 1951 J. JOHNSON 2,568,193
NUT AND FRUIT TREE SHAKING DEVICE
Filed Feb. 2, 1949 4 Sheets-Sheet 1

Inventor
JOHN JOHNSON

By Patrick D. Beavers
Attorney

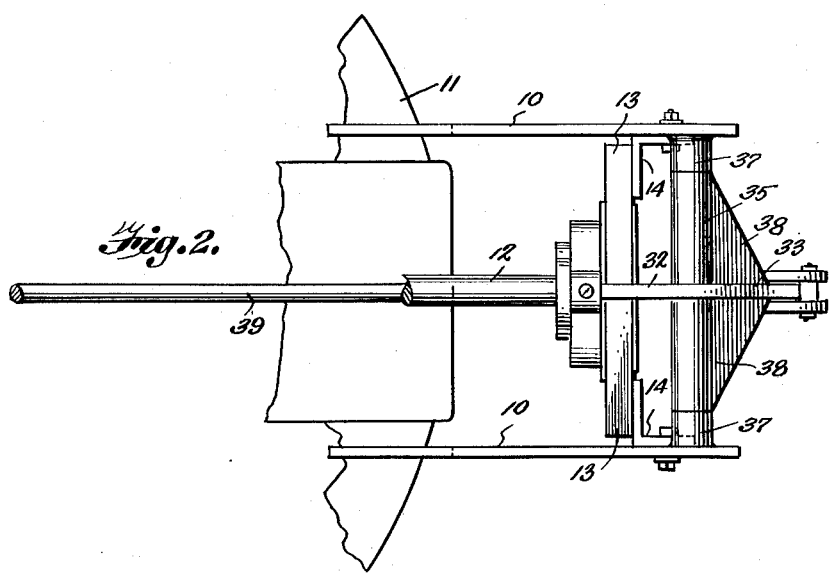
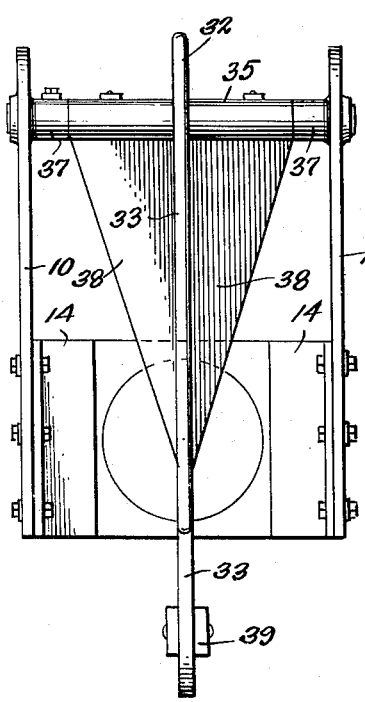
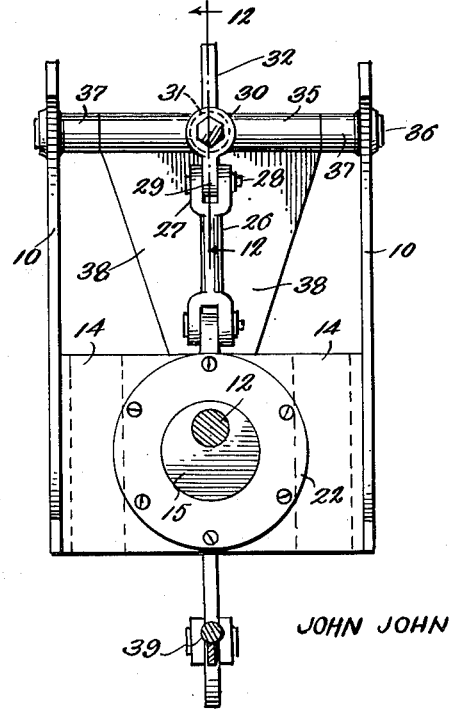

Sept. 18, 1951 J. JOHNSON 2,568,193
NUT AND FRUIT TREE SHAKING DEVICE
Filed Feb. 2, 1949 4 Sheets-Sheet 3
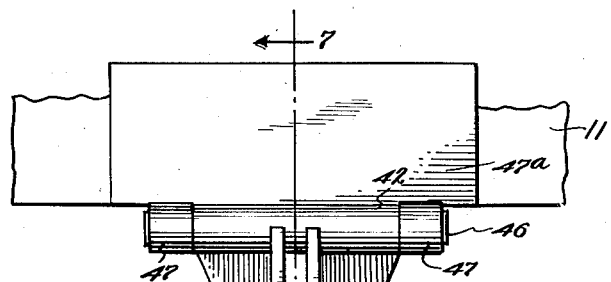
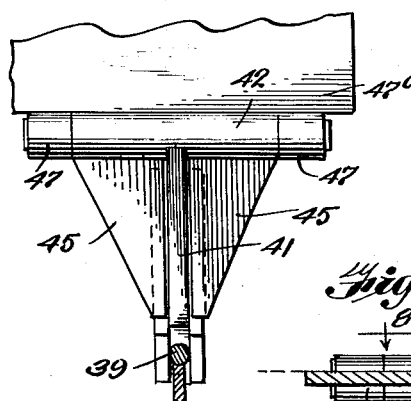
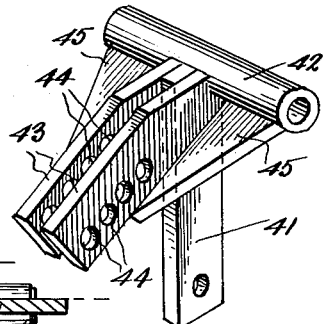
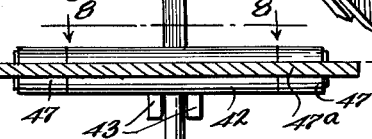
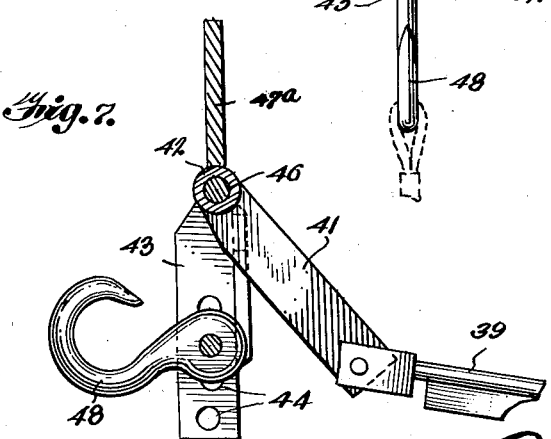
Inventor
JOHN JOHNSON
By Patrick D. Beavers
Attorney

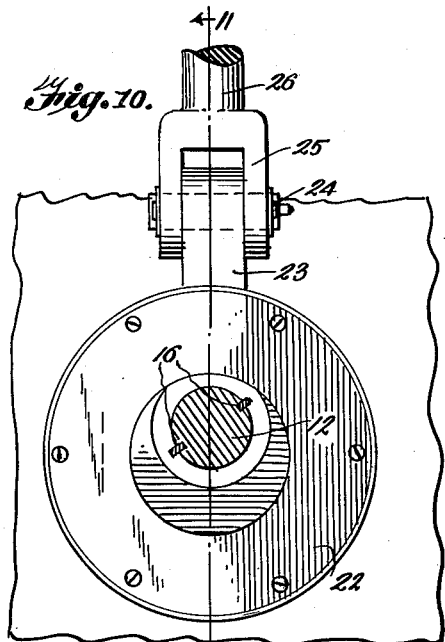

Patented Sept. 18, 1951

2,568,193

UNITED STATES PATENT OFFICE 2,568,193

NUT AND FRUIT TREE SHAKING DEVICE

John Johnson, San Jacinto, Calif.

Application February 2, 1949, Serial No. 74,111

2 Claims. (Cl. 56—328)

1

The present invention relates to a walnut tree shaker and it consists in the combinations, constructions and arrangements of parts herein described and claimed.

Generally the invention comprises an attachment for tractors wherein power is derived from the conventional power takeoff shaft of the tractor by means of an eccentrically mounted collar which imparts reciprocal motion to a link which in turn motivates a rocker arm one end of which extends downwardly and is attached to a throw arm which extends beneath the tractor to the opposite end thereof where it is pivotally connected with one arm of a bell crank lever the other arm of which is provided with an outwardly extending hook. To the hook may be affixed one end of a cable by suitable fastening means and the other end of the cable is adapted to be attached to the limb of a tree whereby, when the device is in motion, nuts may be shaken from the tree.

It is accordingly an object of the invention to provide a device of the character set forth which is simple in its construction and operation and yet effective and efficient in its use.

It is another object of the invention to provide novel means for imparting power to a device of the character set forth.

A further object of the invention is the provision of certain novel mechanical movements in a device of the character set forth.

Another object of the invention is the provision of a bell crank lever of novel construction forming a part of the invention.

Other and further objects of the invention will become apparent from a reading of the following specification taken in conjunction with the drawings, in which:

Figure 2 is fragmentary plan view thereof,

Figure 3 is a sectional view taken along line 3—3 of Figure 1,

Figure 4 is a rear elevational view of Figure 2,

Figure 5 is a sectional view taken along line 5—5 of Figure 1,

Figure 6 is a fragmentary plan view illustrating certain details of construction, Figure 7 is a sectional view taken along line 7—7 of Figure 5, Figure 8 is a sectional view taken along line 8—8 of Figure 6, Figure 9 is a perspective view of an element of the invention, Figure 10 is an enlarged fragmentary view

Figure 1:
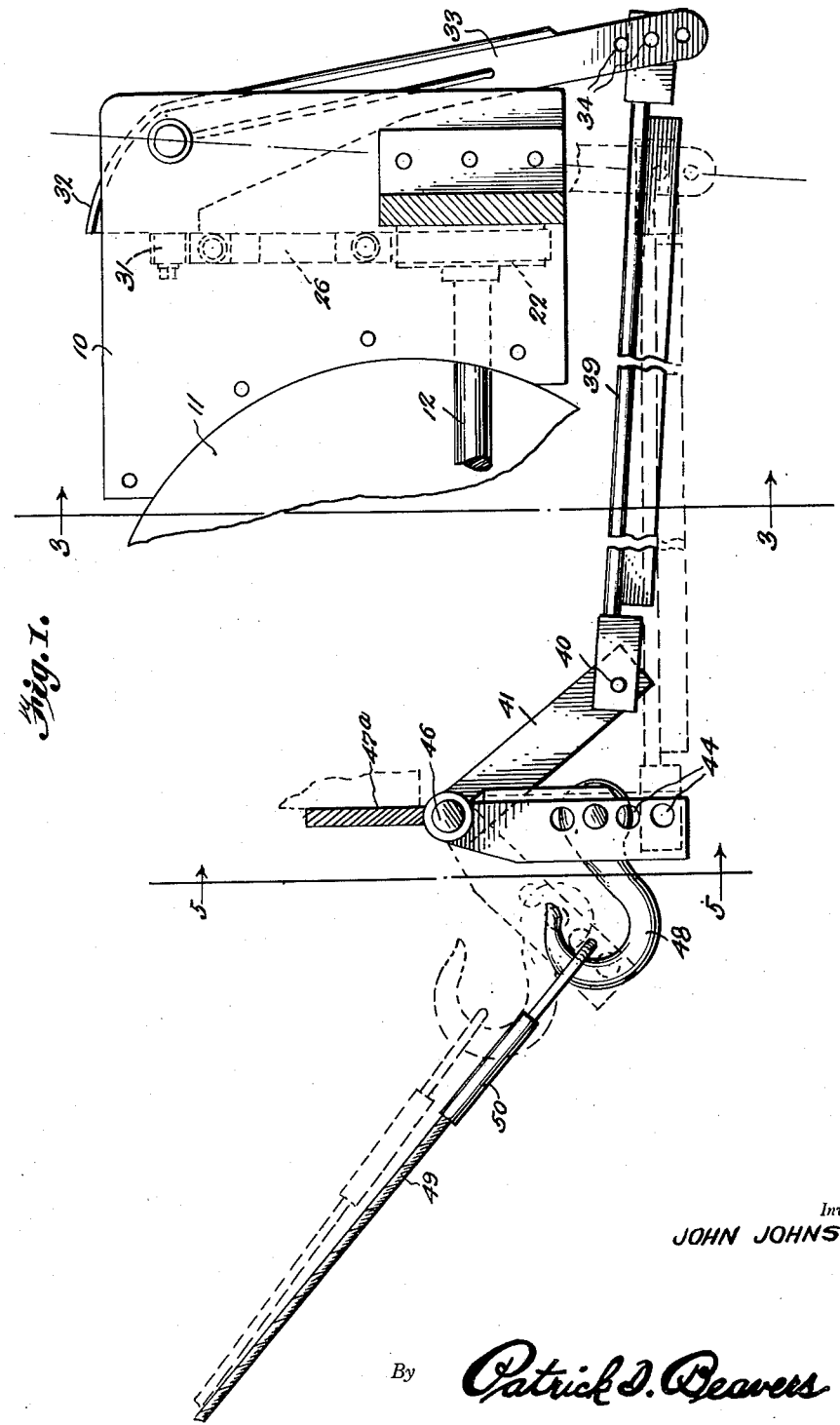
Figure 1 is a side elevational view of an embodiment of the invention.

2 similar to Figure 3 and illustrating certain details of construction,

Figure 11 is a sectional view taken along line 11—11 of Figure 10, and

Figure 12 is a sectional view taken along line 12—12 of Figure 3.

Referring more particularly to the drawings, there is shown therein a pair of plates 10 attached to and extending in parallel relation rearwardly from the conventional differential housing 11 of a conventional tractor.

The tractor is provided with the conventional power takeoff shaft 12 which extends rearwardly and terminates within a transversely extending plate 13 which is held in position by means of brackets 14 attached to the plates 10. An eccentric 15 is keyed to the shaft 12 immediately forwardly of the plate or block 13 and likewise supported within the block 13. The eccentric 15 is keyed to the shaft 12 by means of the keys 16.

Ball bearings 17 surround that portion of the eccentric 15 within the block 13 and ball bearings 18 surround that portion of the eccentric 15 which lies immediately forwardly of the block 13.

A grease reservoir 19 is provided in the block 13 between the rearmost bracket 14 and the rear of the shaft 12 and grease holes 20 and 21 are provided in the eccentric 15 for lubricating the bearings 17 and 18, respectively. The hole 21 is slanted rearwardly, terminating adjacent the inner end of the shaft 12 and communicating with splines 21a formed in the shaft 12. An eccentric housing 22 surrounds the bearings 18 and is provided with an upwardly extending projection 23 which is pivotally connected by means of a pin 24 to the arms of a yoke 25 formed integrally with the lower end of a vertically extending link 26.

The upper end of the link 26 has integrally formed therewith an upwardly extending yoke 27 which is pivotally connected by means of a pin 28 to a dependant arm 29 formed integrally with a collar 30 which surrounds a horizontally extending stub shaft 31 which is formed integrally with a relatively short arm 32 of a bell crank lever whose relatively long arm 33 extends downwardly and is provided with a plurality of openings 34 adjacent its outer extremities. The bell crank level is provided with a transversely extending hub 35 which is pivotally mounted upon an axle 36 which is journaled at either end, as indicated at 37, in the plate 10. Reinforcing triangular shaped webs interconnect the hub 35 and the arm 33. The pins 24 and 28 are equipped with conventional grease fittings.

Pivotally connected in one of the openings 34 at its rear end is a longitudinally extending throw arm 39 which extends beneath the tractor and whose forward end is pivotally connected, as indicated at 40, to a generally vertically extending arm 41 of a bell crank lever which is provided with a hub 42 and an angularly and downwardly extending pair of forward arms 43 each provided with a series of openings 44. Each of the arms 43 is interconnected with the hub 42 by means of a triangular shaped reinforcing plate 45.

The hub 42 is pivotally mounted upon a shaft 46 which is journaled in a pair of ears 47 which are dependantly formed upon a front axle assembly 47a. A hook 48 is adapted to be pivotally mounted in pairs of opposed openings 44 in the arms 43 and a cable 49 is detachably connected with the hook 48 by means of an eye 50.

In operation, it will be apparent that the rotation of the shaft 12 will cause the eccentric 15 to impart a vertical reciprocatory movement to the link 26 thereby vertically reciprocating the arm 32 and, in turn, oscillating the arm 33. This movement will cause a horizontal reciprocation of the throw arm 39 thereby rocking the bell crank lever which is carried forwardly of the tractor. When it is desired to harvest deciduous fruit or the like or walnuts from trees, one end of the cable 49 is fastened to a branch of the tree and the other connected with the hook 48 as shown in Figure 1. The reciprocal or oscillatory motion of the arms 43 will cause a vibration of the branch of the tree to thereby shake therefrom the nuts, fruit or the like.

While but one form of the invention has been shown and described herein, it will be readily apparent to those skilled in the art that many minor modifications may be made without departing from the spirit of the invention or the scope of the appended claims.

What is claimed is:

1. A device of the character described comprising, in combination, a tractor, a power take-off shaft for the tractor, a bell-crank lever mounted at the rear of the tractor, an eccentric upon the shaft, an eccentric housing, a link interconnecting the housing and one arm of the bell-crank, a horizontally reciprocable throw arm beneath the tractor pivotally connected to the other arm of the bell-crank, a hub pivotally connected at the forward end of the tractor, a pair of spaced parallel forwardly extending hook-supporting arms pivotally affixed to the hub, each of said arms provided with a plurality of transverse openings, a dependent lever for moving said hook-supporting arms affixed to said hub and pivotally connected at its outer end to the throw arm, a hook selectively mounted in openings in the supporting arms, and a cable having one end attachable to the hook.

2. A device of the character described comprising, in combination, a tractor, a power take-off shaft for the tractor, a bell-crank lever mounted at the rear of the tractor, an eccentric upon the shaft, an eccentric housing, a link interconnecting the housing and one arm of the bell-crank, a horizontally reciprocable throw arm beneath the tractor pivotally connected to the other arm of the bell-crank, a hub pivotally connected at the forward end of the tractor, a pair of spaced parallel forwardly extending hook-supporting arms pivotally affixed to the hub, each of said arms provided with a plurality of transverse openings, a dependent lever for moving said hook-supporting arms affixed to said hub and pivotally connected at its outer end to the throw arm, a hook selectively mounted in openings in the supporting arms, and a cable having one end attachable to the hook, said throw arm having adjustable pivotal connection with the bell-crank lever arm.

JOHN JOHNSON.

REFERENCES CITED

The following references are of record in the file of this patent:

UNITED STATES PATENTS

| Number | Name | Date |
| --- | --- | --- |
| 1,152,228 | Santus | Aug. 31, 1915 |
| 1,441,108 | Nettleton | Jan. 2, 1923 |
| 1,472,262 | Abildgaard | Oct. 30, 1923 |
| 2,159,311 | Berger | May 23, 1939 |

OTHER REFERENCES

"The Mechanical Tree Shaker," Diamond Walnut News, vol. 25, #4, July 1943, pages 4-6.